United States Patent [19]
Anzinger et al.

[11] Patent Number: 4,749,750
[45] Date of Patent: Jun. 7, 1988

[54] METHOD FOR LUBRICATING PVC PLASTICS

[75] Inventors: Hermann Anzinger, Duesseldorf; Kurt Worschech, Loxstedt; Bernd Wegemund; Uwe Ploog, both of Haan, all of Fed. Rep. of Germany

[73] Assignee: Henkel Kommanditgesellschaft auf Aktien, Duesseldorf, Fed. Rep. of Germany

[21] Appl. No.: 58,676

[22] Filed: May 26, 1987

Related U.S. Application Data

[63] Continuation of Ser. No. 798,648, Nov. 15, 1985, abandoned.

[30] Foreign Application Priority Data

Nov. 17, 1984 [DE] Fed. Rep. of Germany ....... 3442176

[51] Int. Cl.$^4$ ............................................. C08L 72/06
[52] U.S. Cl. .................................................... 525/190
[58] Field of Search ................................. 525/190, 186

[56] References Cited

U.S. PATENT DOCUMENTS

| | | | |
|---|---|---|---|
| 2,785,978 | 3/1957 | de Rijck | 99/23 |
| 3,169,945 | 2/1965 | Hostettler | 525/186 |
| 3,592,877 | 7/1971 | Mullins | 525/186 |
| 3,778,465 | 12/1973 | Barnstorf | 260/409 |
| 4,393,167 | 7/1983 | Holmes | 525/64 |

FOREIGN PATENT DOCUMENTS 0064697 4/1982 European Pat. Off. .
1292548 10/1972 United Kingdom .
1469531 4/1977 United Kingdom .

OTHER PUBLICATIONS

Encyclopedia of Polymer Science and Technology, vol. 14, pp. 396–401; 414–419; J. Wiley and Sons, N.Y., 1971.

Primary Examiner—Patricia A. Short
Attorney, Agent, or Firm—Ernest G. Szoke; Henry E. Millson, Jr.; Mark A. Greenfield

[57] ABSTRACT

A method for lubricating/releasing polyvinyl chloride, its copolymers, or polymer mixtures thereof, in which there is added a polyester comrising the polycondensation product of a $C_{12-24}$ hydroxy carboxylic acid containing a secondary hydroxyl moiety, which may be chain terminated by a $C_{8-24}$ monocarboxylic acid or glycerol.

40 Claims, No Drawings

METHOD FOR LUBRICATING PVC PLASTICS

This application is a continuation, of application Ser. No. 798,648, filed Nov. 15, 1985, now abandoned.

BACKROUND OF THE INVENTION

1. Field of the Invention

This invention relates to a method for lubricating (releasing) PVC containing plastics using a polyester with a comb-like structure obtained by the autocondensation of $C_{12-24}$ hydroxy carboxylic acids containing a secondary hydroxyl moiety.

2. Statement of the Related Art

In the processing of thermoplastic plastics based on polyvinyl chloride, its copolymers, and polymer mixtures into molded, sheet-form, or linear semifinished products, difficulties arise in practice because of the high viscosity of the polymer melts and their pronounced tendency to stick to hot, material-contacting parts of processing machines. To overcome these difficulties, it is standard practice to add lubricants (release agents) which lower melt viscosity (internal lubrication) and reduce tackiness on the hot metal parts (external lubrication). The addition of auxiliaries such as these is particularly important in the case of plasticizer-free products of relatively high molecular weight.

Numerous compounds have already been proposed as lubricants for PVC. Thus, British patent 1,292,548 and corresponding published German application No. 19 07 768 mention esters of long-chain aliphatic carboxylic acids with dihydric or polyhydric alcohols (for example glycol or glycerol). Esters such as these, commonly referred to in Germany as "montanic" esters, are widely used in practice. However, they have a number of disadvantages. Thus, they do not satisfactorily reduce the tackiness of mixtures of suspension polymerized PVC and high-impact additives based on copolymers of methacrylate, butadiene and styrene. They also reduce the transparency of some PVC-compositions and produce little, if any, reduction in stress load on calenders.

Published European patent application No. 64,697 describes lubricants in the form of esters of oligomers of trihydric to hexahydric aliphatic alcohols containing at least three monomer units and $C_{8-36}$ saturated or unsaturated fatty acids, from 30 to 100% of the alcoholic hydroxyl groups being esterified. Although polyether esters such as these enable streakfree films of emulsion-process polyvinyl chloride to be produced by the low-temperature process, nothing is mentioned of a reduction in the stress load during calendering.

Accordingly, there is a need for a lubricant and release agent which, in addition to balanced performance properties, enables the stress load during calendering to be reduced. The desired performance properties include color stability (no deterioration in the color of the material being processed), a reduction in kneading resistance in plastographs and prevention of excessive prolongation of the plasticizing time. A particularly important property is freedom from tack during processing which must be guaranteed even where other polymers, for example high-impact additives, are incorporated.

DESCRIPTION OF THE INVENTION

The present invention relates to polyesters with a comb-like structure of:

at least one $C_{12-24}$ hydroxy carboxylic acid containing a secondary hydroxyl group; and if desired, at least one monocarboxylic acid and/or glycerol as a chain terminator; used as lubricants for the processing of polyvinyl chloride and/or its copolymers and polymer mixtures.

Comb-like polyesters of hydroxy carboxylic acids which may also contain a monofunctional component as a terminal group are already known. Thus, polyesters containing a terminal carboxylic acid moiety at the OH-terminal end are already described in published German application No. 24 30 342 (and corresponding British Pat. No. 1,469,531). U.S. Pat. No. 2,785,978 describes esterification products of the polymers at the C-terminal end with polyhydric alcohols. However, there is no reference in any of the above-mentioned publications to the advantageous properties of these products in the thermoplastic processing of polyvinyl chloride or to their ability to reduce the stress load during calendering and to prolong the tack-free time on mixing rolls, even in the presence of high-impact additives.

In a first embodiment of the invention, pure polyhydroxy carboxylic acids are used. They may be obtained by poly-condensation, i.e. esterification with elimination of water, from the pure hydroxy carboxylic acids.

In a second, preferred embodiment of the invention, the polyhydroxy carboxylic acids used contain a monocarboxylic acid or glycerol as a chain terminator. Polyesters with terminal monocarboxylic acids may be obtained very easily from naturally occurring hydroxy carboxylic acids or from hydroxy carboxylic acids derived from natural substances which, even in admixture, contain a certain percentage of carboxylic acids without any OH functionality. Thus, polymers of ricinoleic acid may be used in accordance with the invention. Suitable ricinoleic acids are the saponification product of castor oil and ricinoleic acids purified by distillation. The acids purified by distillation containing fewer chain-terminating monofunctional components are used when seeking to obtain a relatively high molecular weight product. Hardened ricinoleic acid (12-hydroxystearic acid or relatively pure products obtained therefrom by distillation) may also be used in the same way as ricinoleic acid.

Other suitable polyesters are based on synthetic hydroxy carboxylic acids of natural origin which are the hydrogenation products of epoxidized unsaturated fatty acids. The production of hydroxy carboxylic acids such as these is described in U.S. Pat. No. 3,778,465 and corresponding published German application No. 20 21 530, according to which ethylenically unsaturated fatty acid esters are epoxidized in known manner and hydrogenated in the presence of heavy metal catalysts belonging to the VIIIth Group of the Periodic Table to form secondary alcohols. The hydroxy carboxylic acid esters thus formed may be saponified in known manner to form the hydroxy carboxylic acids. Hydroxy carboxylic acids such as these based on natural fatty acid mixtures or even purified products may be used for producing the polyesters used in accordance with the invention. The preferred purified products are also isomer mixtures, i.e. 9- and 10-hydroxystearic acid formed by epoxidation of oleic acid and subsequent hydrogenation. Highly unsaturated fatty acid mixtures are preferably subjected to the epoxidation and hydrogenation process for producing the polyesters used in accordance with the invention. Fatty acid mixtures such as these are derived from peanut oil, cottonseed oil, soybean oil, sunflower oil, linseed oil, rapeseed oil and oils from land animals or aquatic animals. The hydroxy carboxylic acids produced therefrom primarily contain the isomeric hydroxystearic acids. These isomeric hydroxystearic acids may contain further double bonds if the starting material was rich in linoleic acid or linolenic acid. In addition, $C_{22}$ hydroxy carboxylic acids may be present if the starting material was rich in erucic acid (rapeseed oil fatty acid).

In the production of polyesters from hydroxy carboxylic acids, the molecular weight obtained depends both upon the degree of esterification and upon the quantity of chain-terminating reagents. Thus, dimers are generally obtained where the degree of esterification is 50%, while oligomers containing on average 10 hydroxy carboxylic acid units are obtained where the degree of esterification is 90%. If esterification is continued to a substantially complete conversion, the molecular weight obtained may be regulated through the quantity of monofunctional components. If for example 1 mol of fatty acid is used per 6 mols of hydroxy carboxylic acid, molecules of 6 mols of hydroxy carboxylic acid and 1 mol of fatty acid are generally formed. In the case of the branched polyesters used in accordance with the invention, it is preferred to use from 2 to 20% by weight and, more particularly, from 5 to 15% by weight based on the polyester total weight of $C_{8-24}$ monocarboxylic acids without any further functionality as chain terminators. In this connection, it also is preferred to use saturated or unsaturated fatty acids in this chain length range. The polyester molecules thus synthesized contain a fatty acid residue at one end of the chain and a free carboxyl group at the other end. The acid number is generally in the range from 5 to 60 mg KOH/g and preferably in the range 5 from 20 to 40 mg KOH/g.

Polyesters containing a free secondary hydroxyl group at one end of the chain and an alcohol bound as ester, preferably glycerol, at the other end of the chain may also be used for the application according to the invention. Products such as these may be obtained by transesterifying triglycerides containing hydroxy carboxylic acids with removal of the glycerol from the reaction mixture. Products having an OH number of from 50 to 150 and, more particularly, from 60 to 100 are suitable for this purpose. The total quantity by weight of the glycerol in the polyester should amount to between 1 and 15% by weight and, more particularly, to between 5 and 10% by weight.

Products having a number average molecular weight of 1000 to 5000 are preferred for the application according to the invention. Whereas the lubricating effect diminishes with number average molecular weights below 1000, products having number average molecular weights above 5000 are generally difficult to produce without any particular advantage in performance terms being associated with the higher molecular weight. Accordingly, products having a number average molecular weight of 1500 to 3000 are preferred.

The polyesters with a comb-like structure used in accordance with the invention are used in the quantities normally used for such lubricants. Thus, from 0.3 to 3 parts by weight and, preferably, from 0.5 to 1 part by weight of lubricant may be used per 100 parts of resin.

The polyesters with comb-like structure may be used as lubricants and release agents in accordance with the invention in numerous molding processes for thermoplasts based on polyvinyl chloride, vinyl chloride copolymers or polymer mixtures containing polyvinyl chloride or copolymers thereof. Thus, the polyesters may be used in extrusion, injection molding and, with particular advantage, in calendering. In this case, the polyesters are particularly suitable for use in the calendering of substantially plasticizer-free or at least low plasticizer PVC grades, particularly by the known high-temperature process. However, the polyesters may even be used as additives to known processing aids for low-temperature calendering. By virtue of the in liquid consistency, the polyesters do not cause clouding of the material being processed.

The use according to the invention extends to the processing of PVC-based thermoplasts which have been obtained by suspension polymerization, emulsion polymerization or block (i.e. mass) polymerization, either entirely or at least predominantly. The composition of the raw materials may be varied within wide limits. For example, it is possible to use homopolymers of vinyl chloride and also copolymers thereof, with other vinyl compounds, such as vinyl esters including vinyl acetate, or vinyl ethers. Mixtures of polyvinyl chloride and/or copolymers thereof with other polymers containing or free from vinyl chloride may also be used. Thus, it is standard practice, in the production of high-impact polyvinyl chloride articles, to mix PVC with copolymers based on polyacrylate or polymethacrylate/co-butadiene/co-styrene, polyvinylacetate/co-vinylchloride, mixtures of the foregoing, or the like. In addition, other standard polymer mixtures containing PVC or copolymers thereof may also be successfully molded or otherwise processed in accordance with the invention.

EXAMPLE 1

Polyesters A and B used in accordance with the invention in Examples 1 and 2 were produced as follows:

Polyester A

A mixture of 1000 g of commercial 12-hydroxystearic acid (acid number 174–180; hydroxyl number 154 to 162; iodine number $\leq 5$; saponification number 180 to 186) and 100 ml of xylene were heated for 6 hours to reflux temperature in a flask equipped with a relux condenser and water separator. The water of reaction formed was continuously removed from the reaction mixture through the water separator. In addition, xylene was continuously distilled off so that the sump temperature rose from 140° C. at the beginning to 215° C. at the end. The mixture was then kept at that temperature for 2 hours. Removal of the remaining xylene in vacuo left 950 g of condensation product of the commercial 12-hydroxystearic acid in the form of a yellow oil (acid number 35; molecular weight 1900 as determined by vapor pressure osmometry).

Polyester B

In a flask equipped with a distillation bridge and gas inlet pipe, 1000 g of commercial ricinoleic acid (acid number 177 to 182; hydroxyl number 150 to 163; iodine number 83 to 88; saponification number 180 to 187) were initially heated under nitrogen at normal pressure for 3 hours to sump temperature of 205° C. and then for 1.5 hours to a sump temperature of 210° C. in the presence of 0.1% by weight (1 g) of tin dust as catalyst, the water formed being continuously distilled off from the reaction mixture. After a vacuum of 10 to 50 mbar had been applied, the mixture was kept at a sump temperature of 210° C. for 2.5 hours, after which a total of 50 g of water had distilled off. The residue was cooled under nitrogen to room temperature and decanted from the tin. 950 g of condensation product of the commercial ricinoleic acid were obtained in the form of a yellow oil (acid number 30; molecular weight 2200 as determined by vapor pressure osmometry).

Five basic mixtures were prepared by mechanically mixing the individual constituents:

Mixture Formula I 100 parts by weight of suspension PVC, K-value 60
1.5 parts by weight of dioctyl tin mercaptide
0.5 part by weight of lubricant

Mixture Formula II 100 parts by weight of suspension PVC, K-value 60
1.5 parts by weight of dioctyl tin mercaptide
10.0 parts by weight of poly-(meth)acrylate/co-butadiene/co-styrene
0.5 part by weight of lubricant

Mixture Formula III 100 parts by weight of mass PVC, K-value 60
1.5 parts by weight of dioctyl tin mercaptide
0.5 part by weight of lubricant

Mixture Formula IV 100 parts by weight of mass PVC, K-value 60
1.5 parts by weight of dioctyl tin mercaptide
10.0 parts by weight of poly-(meth)acrylate/co-butadiene/co-styrene
0.5 part by weight of lubricant

Mixture Formula V 60 parts by weight of suspension PVC, K-value 60
40 parts by weight of polyvinyl chloride/co-vinyl acetate (vinyl chloride component<60% by weight)
1.5 parts by weight of dioctyl tin mercaptide
0.5 part by weight of lubricant.

The lubricants tested were the above-described polyesters A and B and also two commercial lubricants namely "Loxiol" G 70 S (a trademark of Neynaber Chemie GMBH, Loxstedt Germany for a high molecular weight three-component ester) and also "Wachs E" (a trademark of Hoechst AG, Germany, for an ester of montanic (octasanoic) acid with a polyfunctional alcohol).

To determine freedom from tack, quantities of 220 g of the molding compositions were rolled out on 450 × 220 mm "Berstorff" laboratory rolls rotating in the same direction (roll temperature 200° C., rotational speed 12.5 min$^{-1}$) to form a continuous sheet which was further processed until the molding composition adhered firmly to the surface of one of the rolls. The gap width between the rolls was adjusted in such a way that the continuous sheet was 0.5 mm thick. The tack-free times are shown in minutes in the following Table. As established in a preliminary test, none of the lubricants affected the color stability of the molding compositions.

TABLE 1

Tack-free time on rolls (in minutes)
T = 200° C.; n = 12.5 r.p.m.; E = 220 g
(250 × 450 mm "Berstorff" laboratory rolls)

| Lubricant (Release Agent) | Mixture Formula | | | | |
|---|---|---|---|---|---|
| | I | II | III | IV | V |
| "Loxiol" G 70 S | 24 | 20 | 22 | 22 | 12 |
| "Wachs E" | 24 | 6 | 18 | 6 | 12 |
| Polyester A (INVENTION) | 26 | 18 | 22 | 12 | 12 |
| Polyester B (INVENTION) | 26 | 18 | 22 | 16 | 12 |

EXAMPLE 2

The plasticizing behavior of the molding composition based on mixture I described in Example 1 was tested by means of a plastograph ("Brabender PL 151 Plasticorder"; cf. P. Klenk "Der Plastverarbeiter", Vol. 21, 1970/7, pages 642–644). The chamber temperature was 165° C. and the rotational speed 20 r.p.m. All the tests were carried out on 31 g of material.

In addition to the plasticizing time, Table 2 below shows the maximum kneading resistance and the kneading resistance 15 minutes after the maximum.

TABLE 2

Plasticizing behavior of lubricants in mixture I

| Lubricant | Plasticizing time (mins) | Kneading resistance maximum | (NM sec$^{-1}$) 15 mins after maximum | Melt temp. (°C.) 15 mins after maximum |
|---|---|---|---|---|
| Polyester A | 7.4 | 23.0 | 19.4 | 162.0 |
| Polyester B | 7.4 | 23.5 | 19.2 | 162.0 |
| "Loxiol" G 70 S | 15.6 | 23.2 | 19.8 | 163.5 |
| None | 1.2 | 27.5 | 19.3 | 161.5 |

In a further test, the stress load was determined in the processing of mixtures I, with the following results. A lower number is more desirable.

TABLE 3

| Lubricant (Mixture I) | Stress Load (kN · cm$^{-1}$) |
|---|---|
| Polyester A | 37.3 |
| Polyester B | 39.8 |
| "Loxiol" G 70 S | 41.2 |
| "Wachs E" | 40.0 |

What is claimed is:

1. A method for lubricating/releasing a polymeric substance comprising polyvinly chloride, its copolymers, or polymer mixtures thereof comprising adding to 100 parts by weight of the polymeric substance to be treated about 0.3 to 3 parts by weight of a polyester consisting essentially of: the polycondensation product of at least one $C_{12-24}$-hydroxycarboxylic acid containing a secondary hydroxyl moiety, or said polycondensation product with at least one $C_{8-24}$ monocarboxylic acid, glycerol, or a mixture thereof, as a chain terminator; said polyester having a comb-like structure.

2. The method of claim 1 wherein acid is obtained by epoxidation of an unsaturated fatty acid or a mixture of unsaturated fatty acids with subsequent hydrogenation of the epoxide moiety to a hydroxyl moiety.

3. The method of claim 1 wherein said hydroxy carboxylic acid is an isomeric mixture of 9-hydroxystearic acid and 10-hydroxystearic acid.

4. The method of claim 1 wherein said hydroxy carboxylic acid is ricinoleic acid, or a mixture thereof.

5. The method of claim 1 wherein said chain terminator is present and is at least one $C_{8-24}$ monocarboxylic acid present in about 2 to 20% by weight or is glycerol present in about 1 to 15% by weight, based on the polyester total weight.

6. The method of claim 2 wherein said chain terminator is present and is at least one $C_{8-24}$ monocarboxylic acid present in about 2 to 20% by weight or is glycerol present in about 1 to 15% by weight, based on the polyester total weight.

7. The method of claim 3 wherein said chain terminator is present and is at least one $C_{8-24}$ monocarboxylic acid present in about 2 to 20% by weight or is glycerol present in about 1 to 15% by weight, based on the polyester total weight.

8. The method of claim 4 wherein said chain terminator is present and is at least one $C_{8-24}$ monocarboxylic acid present in about 2 to 20% by weight or is glycerol present in about 1 to 15% by weight, based on the polyester total weight.

9. The method of claim 1 wherein said chain terminator is present and is at least one $C_{8-24}$ monocarboxylic acid present in about 5 to 15% by weight or is glycerol present in about 5 to 10% by weight, based on the polyester total weight.

10. The method of claim 2 wherein said chain terminator is present and is at least one $C_{8-24}$ monocarboxylic acid present in about 5 to 15% by weight or is glycerol present in about 5 to 10% by weight, based on the polyester total weight.

11. The method of claim 3 wherein said chain terminator is present and is at least one $C_{8-24}$ monocarboxylic acid present in about 5 to 15% by weight or is glycerol present in about 5 to 10% by weight, based on the polyester total weight.

12. The method of claim 4 wherein said chain terminator is present and is at least one $C_{8-24}$ monocarboxylic acid present in about 5 to 15% by weight or is glycerol present in about 5 to 10% by weight, based on the polyester total weight.

13. The method of claim 1 wherein said polyester has a number average molecular weight of about 1,000 to 5,000.

14. The method of claim 5 wherein said polyester has a number average molecular weight of about 1,000 to 5,000.

15. The method of claim 9 wherein said polyester has a number average molecular weight of about 1,000 to 5,000.

16. The method of claim 1 wherein said polyester has a number average molecular weight of about 1,500 to 3,000.

17. The method of claim 6 wherein said polyester has a number average molecular weight of about 1,500 to 3,000.

18. The method of claim 7 wherein said polyester has a number average molecular weight of about 1,500 to 3,000.

19. The method of claim 8 wherein said polyester has a number average molecular weight of about 1,500 to 3,000.

20. The method of claim 10 wherein said polyester has a number average molecular weight of about 1,500 to 3,000.

21. The method of claim 11 wherein said polyester has a number average molecular weight of about 1,500 to 3,000.

22. The method of claim 12 wherein said polyester has a number average molecular weight of about 1,500 to 3,000.

23. The method of claim 1 wherein said polyester is added in an amount of about 0.5 to 1 part by weight per 100 parts by weight of said polymeric substance.

24. The method of claim 1 wherein said polymeric substance, after addition of said polyester, is subjected to calendering.

25. The method of claim 24 wherein said polymeric substance is a mixture of: polyvinyl chloride and polymethacrylate/co-butadiene/co-styrene; polyvinyl chloride and polyvinylacetate/co-vinyl chloride; or a combination of the foregoing.

26. The method of claim 24 said polymeric substance is at least predominantly: polyvinyl chloride obtained by suspension polymerization, polyvinyl chloride obtained by mass polymerization, or a mixture thereof; and wherein said calendering is by a high temperature process.

27. The method of claim 1, wherein said polyester is obtained from a naturally occurring mixture of a hydroxycarboxylic acid with a carboxylic acid having no hydroxyl functionality.

28. The method of claim 1, wherein said polyester is obtained from a mixture of a hydroxycarboxylic acid derived from a natural substance with a carboxylic acid having no hydroxyl functionality.

29. The method of claim 4, wherein the ricinoleic acid or mixture thereof is purified ricinoleic acid, hardened ricinoleic acid, purified hardened ricinoleic acid, or saponified castor oil.

30. The method of claim 1, wherein the hydroxycarboxylic acid is obtained by epoxidation of an unsaturated fatty acid ester or a mixture of unsaturated fatty acid esters, with subsequent hydrogenation of the epoxide moiety to a hydroxyl moiety to form a hydroxycarboxylic acid ester, followed by saponification of the ester to the corresponding hydroxycarboxylic acid.

31. The method of claim 2, wherein the hydroxycarboxylic acid is obtained by epoxidation of a mixture of naturally occurring unsaturated fatty acids.

32. The method of claim 31, wherein the mixture is purified prior to epoxidation.

33. The method of claim 31, wherein the mixture contains highly unsaturated fatty acids.

34. The method of claim 33, wherein the mixutre is derived from peanut, cottonseed, soybean, sunflower, linseed, or rapeseed oil 35. The method of claim 1, wherein said polyester polycondensation product contains a free chain-terminal secondary hydroxyl group and a chain-terminal carboxylic acid group esterified with glycerol.

36. The method of claim 35, wherein the polyester is obtained by transesterification of a triglyceride containing a hydroxycarboxylic acid.

37. The method of claim 1, wherein said condensation product is an oligomer containing an average of 10 hydroxylcarboxylic acid residues.

38. The method of claim 24, wherein the polymeric substance subjected to calendering is substantially plasticizer-free.

39. The method of claim 1, wherein the polymeric substance is substantially plasticizer-free.

40. The method of claim 2, wherein the hydroxycarboxylic acid is a mixture of hydroxystearic acids obtained by epoxidation of oleic acid with subsequent hydrogenation of the epoxide moiety.

* * * * *